(12) United States Patent
Park et al.

(10) Patent No.: US 8,359,492 B2
(45) Date of Patent: Jan. 22, 2013

(54) METHOD AND APPARATUS FOR RESTORING SYSTEM USING VIRTUALIZATION

(75) Inventors: Seong-yeol Park, Yongin-si (KR); Min-sung Jang, Seoul (KR); Jae-min Park, Seoul (KR); Sang-bum Suh, Seoul (KR); Sung-kwan Heo, Seoul (KR); Byung-woan Kim, Seoul (KR); Myung-jae Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 12/266,855

(22) Filed: Nov. 7, 2008

(65) Prior Publication Data

US 2009/0271605 A1    Oct. 29, 2009

(30) Foreign Application Priority Data

Apr. 29, 2008 (KR) .......................... 10-2008-0039933

(51) Int. Cl.
  *G06F 11/00* (2006.01)

(52) U.S. Cl. .......................................... 714/15; 714/20

(58) Field of Classification Search .................... 714/15, 714/20
See application file for complete search history.

(56) References Cited

U.S. PATENT DOCUMENTS

| | | | |
|---|---|---|---|
| 6,173,417 B1 * | 1/2001 | Merrill | 714/15 |
| 6,795,966 B1 * | 9/2004 | Lim et al. | 718/1 |
| 6,799,258 B1 * | 9/2004 | Linde | 711/162 |
| 7,243,267 B2 * | 7/2007 | Klemm et al. | 714/38 |
| 7,290,112 B2 * | 10/2007 | Aguilar et al. | 711/202 |
| 7,437,506 B1 * | 10/2008 | Kumar et al. | 711/114 |
| 7,480,822 B1 * | 1/2009 | Arbon et al. | 714/13 |
| 7,627,728 B1 * | 12/2009 | Roeck et al. | 711/162 |
| 7,831,787 B1 * | 11/2010 | Yueh | 711/161 |
| 2005/0125513 A1 * | 6/2005 | Sin-Ling Lam et al. | 709/220 |
| 2005/0160243 A1 * | 7/2005 | Lubbers et al. | 711/162 |
| 2005/0234846 A1 * | 10/2005 | Davidson et al. | 707/1 |
| 2008/0115134 A1 * | 5/2008 | Elliott et al. | 718/101 |
| 2008/0177994 A1 * | 7/2008 | Mayer | 713/2 |
| 2009/0024813 A1 * | 1/2009 | Uysal et al. | 711/162 |
| 2009/0133016 A1 * | 5/2009 | Brown et al. | 718/1 |

FOREIGN PATENT DOCUMENTS

| | | |
|---|---|---|
| KR | 2003-81466 | 10/2003 |
| KR | 2005-18735 | 2/2005 |
| KR | 2006-134211 | 12/2006 |

* cited by examiner

*Primary Examiner* — Scott Baderman
*Assistant Examiner* — Elmira Mehrmanesh
(74) *Attorney, Agent, or Firm* — NSIP Law (57) ABSTRACT

A method and apparatus to restore a system using virtualization, the method including: if a system restoration at a target restoration time point from among at least one restoration time points is requested, generating a virtualization layer; if a use of a system is requested by an application layer, accessing the target restoration time point using the virtualization layer; and performing a system restoration at the accessed target restoration time point.

29 Claims, 6 Drawing Sheets

<SYSTEM CONFIGURATION
TO BE RESTORED>

<CURRENT SYSTEM
CONFIGURATION>

METHOD AND APPARATUS FOR RESTORING SYSTEM USING VIRTUALIZATION

CROSS-REFERENCE TO RELATED APPLICATION

This application claims the benefit of Korean Application No. 2008-39933, filed Apr. 29, 2008, in the Korean Intellectual Property Office, the disclosure of which is incorporated herein by reference.

BACKGROUND OF THE INVENTION

1. Field of the Invention

Aspects of the present invention relate to a method and apparatus to restore a system using virtualization, and more particularly, to a method and apparatus to restore a system using virtualization without rebooting the system.

2. Description of the Related Art

"System Restore," which is a component of a Windows operating system, cancels system files, registry keys, and installed programs, and restores settings and performances of a system to a previous state.

If a user requests a restoration to a specific point-in-time since an error occurs in a system, the user stops using the system in order to perform a system restoration and the system reboots to reflect a restored system configuration. To this end, the system is restored to a point-in-time as the user wishes and provides the user with a previous system configuration.

However, in a conventional method of restoring a system, the user logs off in order to stop using the system and reboots the system to reflect a restored system configuration. Thus, a large amount of time is taken to complete the system restoration. Also, in the conventional method, the user is not allowed to check a restoration result in advance. Therefore, if there is an error in the system restoration after the system reboots, the user must again log off and reboot the system.

SUMMARY OF THE INVENTION

Aspects of the present invention provide a method and apparatus to restore a system using virtualization, and more particularly, to restore a system rapidly without rebooting a computer.

According to an aspect of the present invention, there is provided a method of restoring a system using virtualization, the method including: if a system restoration at a target restoration time point from among at least one restoration time point is requested, generating a virtualization layer; if a use of the system is requested by an application layer, accessing the target restoration time point using the virtualization layer; and performing a system restoration at the accessed target restoration time point.

The method may further include: if the system restoration is requested, establishing a virtualization restoration policy; and configuring a single virtualization system from the target restoration time point to an initial restoration time point according to the virtualization restoration policy.

The virtualization restoration policy may include a priority order policy, wherein the virtualization layer accesses restoration points from the target restoration time point to the initial restoration time point in sequence based on the priority order policy.

The accessing may include: by the virtualization layer, redirecting a request from the application layer to the virtualization system; and by the virtualization layer, accessing the target restoration time point of the virtualization system.

If the virtualization layer is generated, the application layer may recognize that the system restoration has been performed, and the system restoration is completed without rebooting the system.

The method may further include: if the system restoration is completed, executing a job, by the application layer, related to the request.

The method may further include: after the system restoration is completed, requesting a rebooting of the system; applying a system configuration at the restored target restoration time point as a current system configuration; and performing the rebooting.

The applying of the system configuration at the target restoration time point as a current system configuration may be selectable by a user.

The virtualization layer may be generated in an operating system layer.

The at least one restoration time points may be stored in order as they are generated, and the performing of a system restoration may access restoration points from the target restoration time point to an initial restoration time point in a reverse order to the storing order.

The system restoration may be performed in a host operating system or a virtual operating system installed in a mobile storage medium.

If a plurality of the target restoration time points are selected, system restorations for the plurality of the target restoration time points may be simultaneously performed.

System restorations corresponding to the respective target restoration time points may be respectively provided through different desktop scenes.

According to another aspect of the present invention, there is provided a restoration system using virtualization, the restoration system including: a storage layer to store at least one restoration time point; an application layer to request a use of the system and to request a system restoration at a target restoration time point of the at least one restoration time point; and an operating system layer to generate a virtualization layer if the system restoration is requested, and to perform the system restoration at the target restoration time point using the virtualization if the use of the system is requested.

The operating system layer may include a restoration manager to establish, if the system restoration is requested, a virtualization restoration policy and to configure a single virtualization system from the target restoration time point to an initial restoration time point according to the virtualization restoration policy.

The virtualization layer may redirect a request from the application layer to the virtual system and access the target restoration time point of the virtualization system.

If a rebooting of the system is requested after the system restoration has been completed, the operating system layer may apply a system configuration of the restored target restoration time point as a current system configuration and then perform the rebooting.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
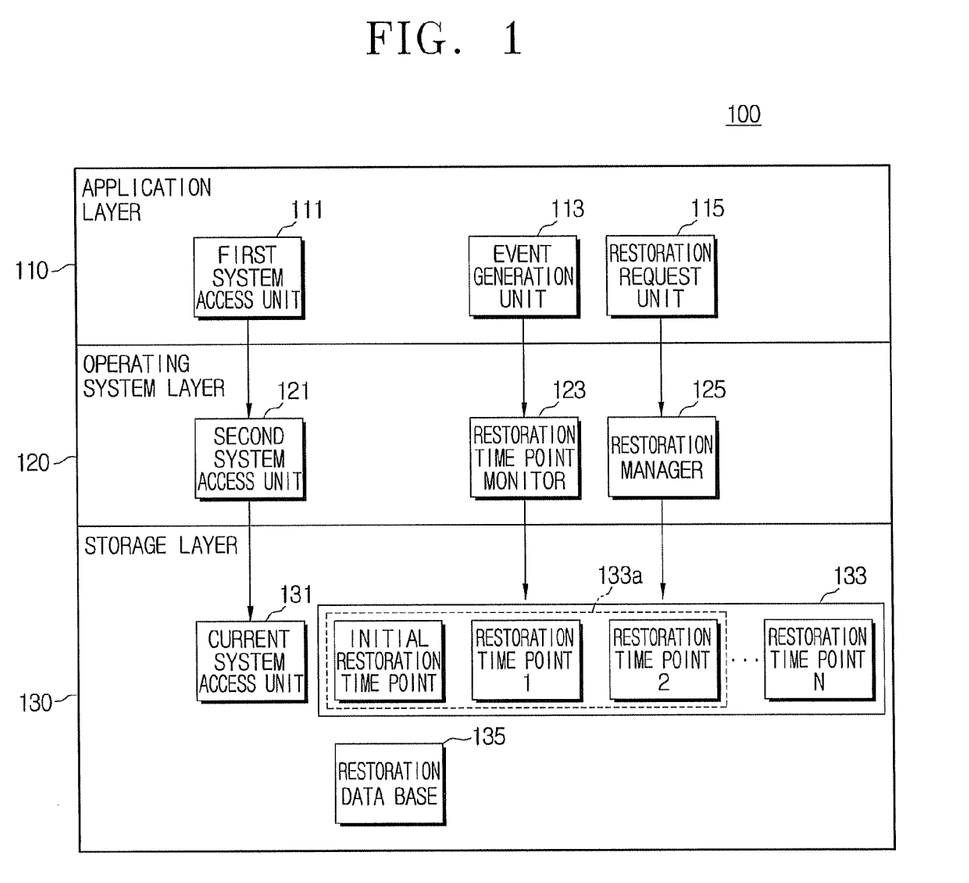
FIG. 1 is a block diagram illustrating a restoration system using virtualization according to an embodiment of the present invention.

FIG. 1 illustrates a restoration system 100 using virtualization according to an embodiment of the present invention. The restoration system 100 using virtualization is applicable to a host computer that is based, for example, on a Windows operating system (such as a desktop computer, a laptop computer, a mobile phone, etc.). If a system error occurs during a use of the host computer or if a user wishes to work under a previous environment, the Windows operating system provides an operation of restoring a system to an environment of a time point as the user wishes. In particular, aspects of the present invention restore a computing system without rebooting a host computer so that the user more conveniently uses the system restoration operation.

Referring to FIG. 1, the restoration system 100 using virtualization includes an application layer 110, an operating system layer 120, and a storage layer 130. The application layer 110 receives data from a user through an installed application program and/or executes an application program corresponding to a user's request to perform a job. Also, the application layer 110 requests a use of the system and requests a restoration of the system at a restoration time point selected (hereinafter, a target restoration time point) from at least one restoration time point. For this, the application layer 110 includes a first system access unit 111, an event generation unit 113, and a restoration request unit 115.

If the use of the system is requested from a user through the application layer 110, the first system access unit 111 requests the operating system layer 120 to have access to a current system configuration unit 131 in the storage layer 130. The request for the use of the system is a request for a specific job (such as a use of an application program, an opening of a file, and a printing).

The event generation unit 113 generates an event if there is a change in states of a restoration object and a non-restoration object. For example, the event generation unit 113 periodically generates an event or generates an event if, for example, an application program or a driver is installed or deleted, if information stored in a registry changes, or if contents of a "My Documents" folder change.

The restoration object is an element that is restored if a system restoration is requested from the user, and the non-restoration object is an element that is not restored even if there is a request for the system restoration. Examples of the restoration object include a registry, files that are monitored, user profiles, a COM+ database, a Windows filtering program, a dll cache, a Windows management instrumentation database, and an Internet information services metabase. Examples of the non-restoration object include digital rights management settings, passwords in the SAM hive, Wi-Fi Protected Access settings, specified directories and/or files, and personal data file types (such as .doc, .htm, and .jpg).

The restoration request unit 115 requests the operating system layer 120 to restore the system if the system restoration is requested from the user. The user may select a restoration time point through a graphical user interface (GUI) provided by the operating system, and the restoration request unit 115 outputs the restoration time point selected by the user (i.e., the target restoration time point) to the operating system layer 120. The GUI allows the user to select a date or time as the target restoration time point and may include a calendar and/or a clock.

The operating system layer 120 controls hardware installed in the host computer and manages an application program using a Windows operating system (such as Windows ME, Windows XP, or Windows Vista). Also, the operating system layer 120 generates a virtualization layer 127 if a system restoration is requested from the restoration request unit 115 and restores the system to that of the target restoration time point using the virtualization layer 127 if the use of the system is requested from the first system access unit 111. For this, the operating system layer 120 includes a second system access unit 121, a restoration time point monitor 123, and a restoration manager 125.

If a request to access a current system configuration is made by the first system access unit 111, the second system access unit 121 accesses to the current system configuration unit 131 to allow the application layer 110 to use the current system configuration of the current system configuration unit 131 and to perform a job corresponding to the request.

If a program that is capable of restoring a system without rebooting is installed in the storage layer 130, the restoration time point monitor 123 generates an initial restoration time point to the storage layer 130. At this time, the storage layer 130 may store a system configuration corresponding to the initial restoration time point along with the initial restoration time point. Furthermore, the restoration time point monitor 123 monitors the event generator 113. Accordingly, if an event for the restoration object occurs, the restoration time point monitor 123 generates a restoration time point in the storage layer 130 and stores a system configuration corresponding to the generated restoration time point in the storage layer 130 (for example, in the form of a lookup table or other link form).

If the event generated in the event generator 113 is to be generated from a restoration object, the restoration time point monitor 123 generates a restoration time point in the storage layer 130. Data on the restoration objects may be stored in the storage layer 130. Also, if the user requests generation of a restoration time point manually using, for example, "System Restore Wizard" provided by the Windows operating system, the restoration time point monitor 123 generates a restoration time point corresponding to the selected date and/or time in the storage layer 130. However, it is understood that a method of generating a restoration time point is not limited to this case.

The restoration time point monitor 123 stores, in the storage layer 130, respective restoration time points as they are generated. Accordingly, the storage layer 130 stores an initial restoration time point, a restoration time point 1, a restoration time point 2, . . . , a restoration time point N (N is a positive number) in sequence.

Figure 2:
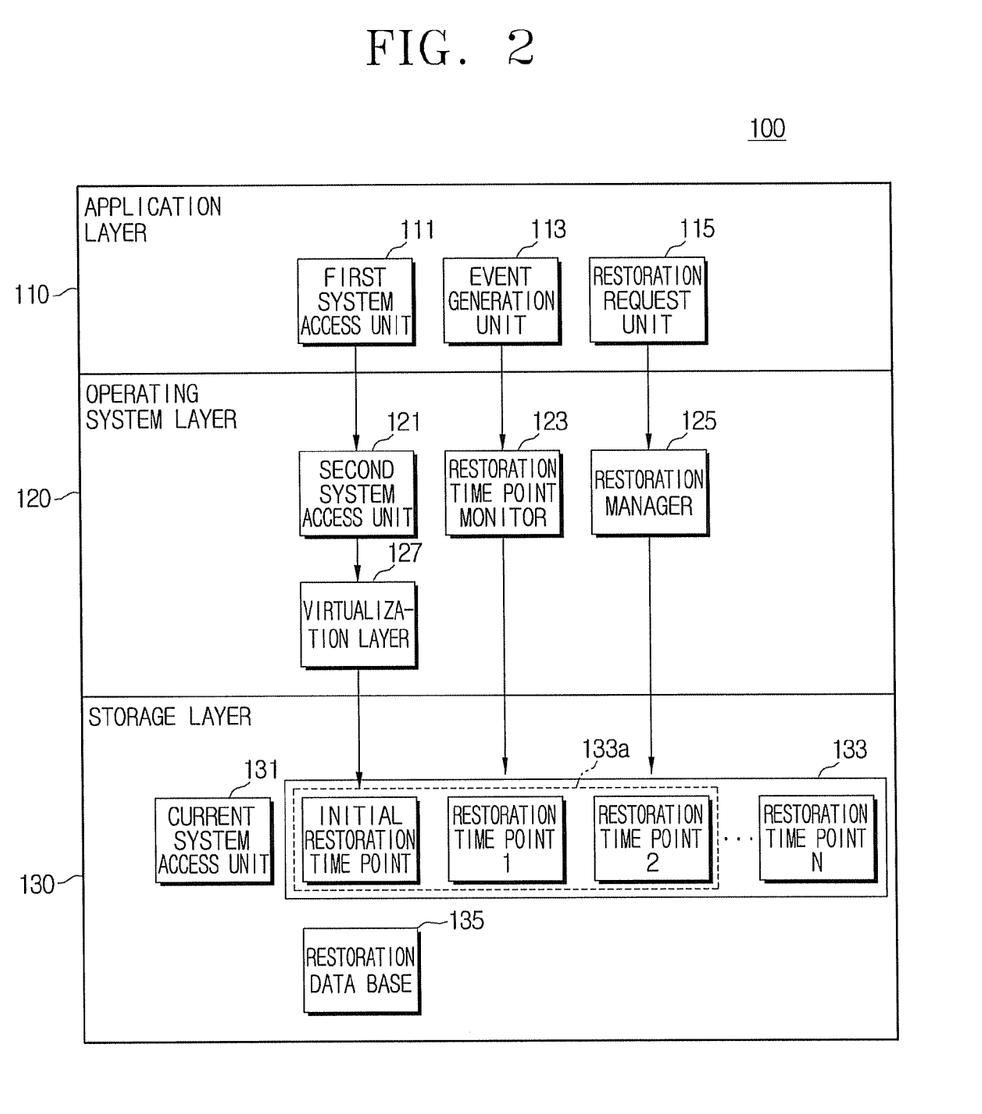
FIG. 2 is a block diagram illustrating the restoration system where a virtualization layer is generated by a restoration manger of FIG. 1, according to an embodiment of the present invention.

If a system restoration corresponding to the target restoration time point is requested from the restoration request unit 115, the restoration manager 125 configures a single virtualization system in the storage layer 130 and generates the virtualization layer 127 in the operating system layer 120. Accordingly, although an actual system restoration is not performed, the application layer 110 recognizes that the system restoration of the target restoration time point has been completed. More specifically, if a system restoration is requested, the restoration manager 125 establishes a virtualization restoration policy and configures a single virtualization system 133a from the target restoration time point to the initial restoration time point according to the established virtualization restoration policy. Thus, the restoration manager 125, as shown in FIG. 2, generates the virtualization layer 127 in the operating system layer 120. If the restoration time point 2 is selected as the target restoration time point, the restoration manager 125 configures a single virtualization system 133a from the restoration time point 2 to the initial restoration time point and generates the virtualization layer 127. Herein, the virtualization restoration policy includes a priority order policy, such that the virtualization layer 127 gets access from the target restoration time point to the initial restoration time point in sequence according to the priority order policy when the actual system restoration is performed.

Also, the restoration manager 125 loads a specific component from a system configuration corresponding to each restoration time point to a memory of the storage layer 130 such that the second system access unit 121 gets access to the specific component. The specific component may, for example, be a registry and/or a DLL (Dynamic Linking Library) file. This is to allow easy access to a demanding file and to restore the system when an actual system restoration is performed by the request for the use of the system from the application layer 110.

The storage layer 130 includes a current system configuration unit 131, a restoration time point storage unit 133, and a restoration data base 135. The current system configuration unit 131 stores information about a current computer system configuration (for example, a registry and a file system). Before the system restoration is requested, the second system access unit 121 allows a job requested by the user to be performed using the current system configuration of the current system configuration unit 131.

On the other hand, after the system restore is requested, the system of the target restoration time point is restored by the restoration manager 125. Accordingly, if the use of the system is requested from the application layer 110, a virtualized system configuration of the restoration time point storage unit 133 is used instead of the current system configuration.

The restoration time point storage unit 133 stores the restoration time points generated by the restoration time point monitor 123 as they are generated according to a priority order policy. The restoration time points are stored in a file format.

The restoration data base 135 stores system configurations corresponding to respective restoration time points. For example, system configurations respectively corresponding to a restoration time point 1 and a restoration time point 2 may have different parts of a registry, and system configurations respectively corresponding to a restoration time point N−1 and a restoration time point N may have different parts of a file system. The restoration data base 135 stores the system configurations corresponding to the respective restoration time points. That is, the restoration data base 135 stores the system configurations that are collected by the restoration time point monitor 123 when the respective restoration time points are generated.

FIG. 2 illustrates the restoration system 100 where the virtualization layer is generated by the restoration manger of FIG. 1, according to an embodiment of the present invention. Referring to FIG. 2, if a system restoration is requested by the restoration request unit 115, the restoration manger 125 generates the virtualization layer 127 in the operating system layer 120 and a single virtualized system configuration 133a in the storage layer 130. Specifically, the restoration manager 125 configures a single virtualized system by combining restoration time points from an initial restoration time point to a target restoration time point. To this end, the application layer 110 recognizes that the system restoration has been completed despite the fact that the system restoration is not actually completed. Hereinafter, a restoration time point 2 is regarded as a target restoration time point.

The virtualization layer 127 connects the virtualized system configuration 133a (instead of the current system configuration unit 131) to the second system access unit 121 to allow the application layer 110 to use the virtualized system configuration 133a. As an example, the virtualization layer 127 may be realized in the form of a drive in a practical application or may be loaded to a kernel memory. Furthermore, the virtualization layer 127 may perform a redirection, which will be described below, using an actual native function hooking technique or an IRP (I/O Request Packet) filtering technique, which is well known in the related art. More specifically, if a user requests the use of the system in the application layer 110, the first system access unit 111 transmits the request for the use of the system to the second system access unit 121. The second system access unit 121 tries to get access to the current system configuration unit 131. However, at this time, the virtualization layer 127 redirects the request of the application layer 110 output through the second system access unit 121 to the restoration time point 2 (i.e., the target restoration time point) of the virtualized system configuration 133a. Then, the virtualization layer 127 gets access from the restoration time point 2 to the initial restoration time point in a reverse order to the storing order, thereby performing an actual system restoration.

Figure 3:
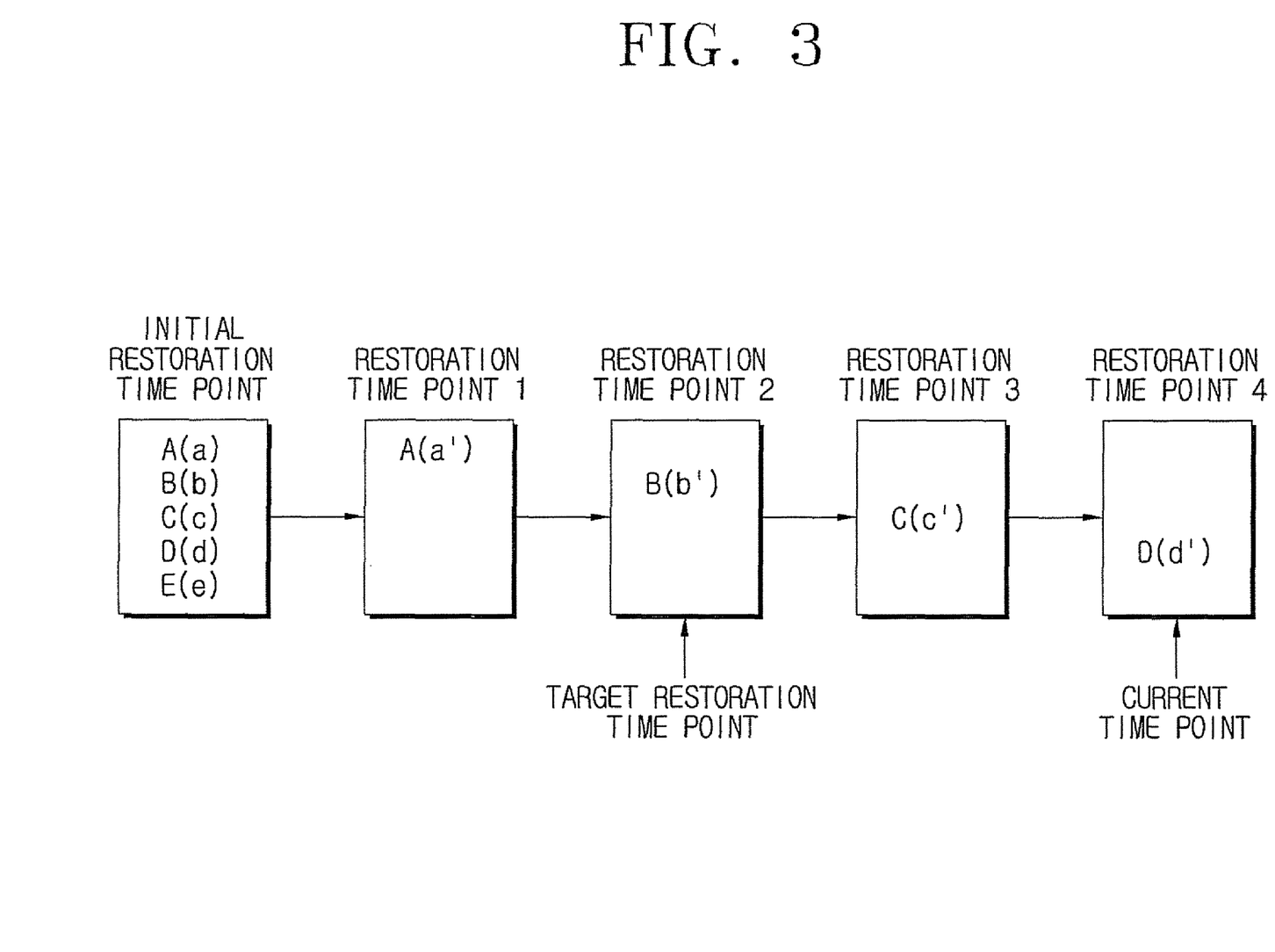
FIG. 3 is a diagram illustrating restoration time points generated by the restoration time point monitor of FIGS. 1 and 2 up to a present time and system states changing over the respective restoration time points by way of an example.
Figure 4:
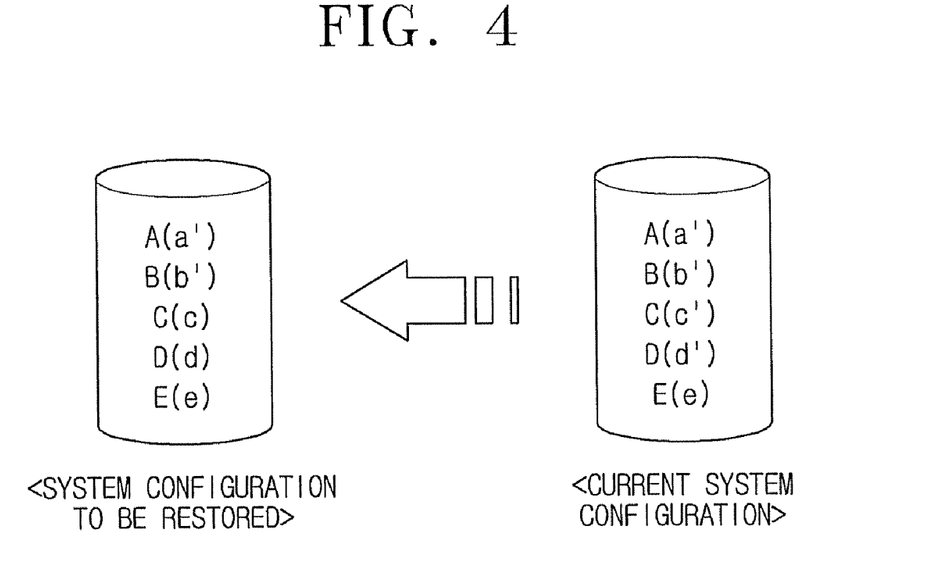
FIG. 4 is a diagram illustrating an embodiment of a current system configuration and a system configuration to be restored if a restoration time point of FIG. 3 is selected as a target restoration time point.
Figure 5:
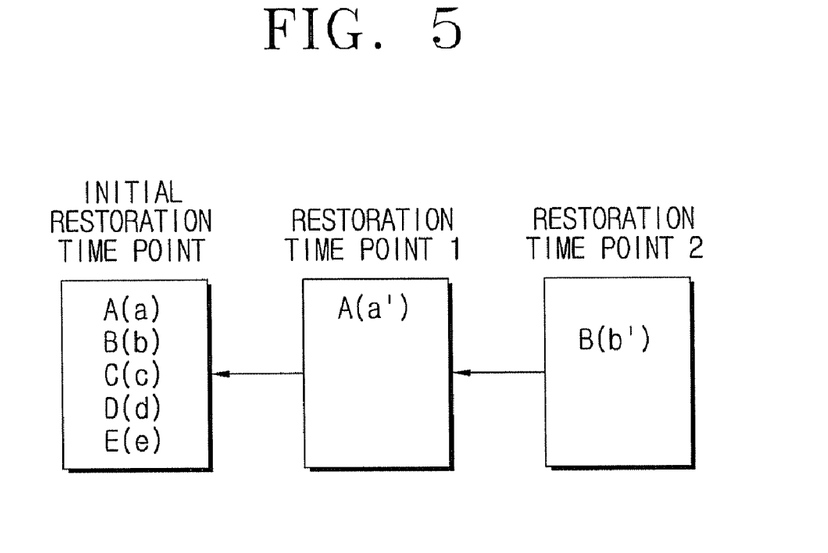
FIG. 5 is a diagram illustrating a process of restoring an actual system by performing a redirection according to an embodiment of the present invention.

FIG. 3 illustrates restoration time points that are generated up to a present time by the restoration time point monitor 123 and system states that change over the respective restoration time points by way of an example. FIG. 4 illustrates a current system configuration and a system configuration to be restored if the restoration time point 2 of FIG. 3 is selected as a target restoration time point by way of an example. FIG. 5 illustrates a process of restoring an actual system by performing a redirection according to an embodiment of the present invention.

Referring to FIG. 3, the restoration time point storage unit 133 stores an initial restoration pint and a restoration time point 1 through a restoration time point 4, which corresponds to the present time. System configurations corresponding to the respective restoration time points are stored to the restoration data base 135. For example, a system configuration corresponding to the initial restoration time point includes "A(a)," "B(b)," "C(c)," "D(d)," and "E(e).", where "A," "B," "C," "D," and "E" denote groups of restoration objects and "a," "b," "c," "d," and "e" denote elements respectively belonging to the groups. For example, if "A" is a file system, "a'" is a file changed from "a," and if "B" is a registry, "b'" is a registry key changed from "b".

If "A(a)" changes to "A(a')" after the initial restoration time point is generated, the restoration time point monitor 123 generates a restoration time point 1, maps the changed information "A(a')" to the restoration time point 1, and stores the information to the storage layer 130. If "B(b)" changes to "B(b')," the restoration time point monitor 123 generates a restoration time point 2, maps the changed information "B(b')" to the restoration time point 2, and stores the information to the storage layer 130. If "C(c)" changes to "C(c')" after a predetermined time, the restoration time point monitor 123 generates the restoration time point 3, maps the changed information "C(c')" to the restoration time point 3, and stores the information. If "D(d)" changes to "D(d')," the restoration time point monitor 123 generates a restoration time point 4, maps the changed information "D(d') to the restoration time point 4, and stores the information to the storage layer 130. Accordingly, a current system configuration of the current system configuration unit 131 corresponding to the restoration time point 4 includes "A(a')," "B(b')," "C(c')," "D(d')," and "E(e)," as shown in FIG. 4.

If a user selects the restoration time point 2 through a GUI after the restoration time point 4 is generated, the restoration request unit 115 informs the restoration manager 125 that the restoration time point 2 has been selected as a target restoration time point. Consequently, the restoration manger 125 creates a single virtualized system configuration 133a from the restoration time point 2 to the initial restoration time point and generates a virtualization layer 127.

If the use of the system is requested from the application layer 110, the virtualization layer 127 redirects the request and accesses the restoration time point 2 of the virtualized system configuration 133a to perform a system restoration. That is, the virtualization layer 127 checks a system configuration corresponding to the restoration time point 2 in the restoration data base 135 and confirms that the information "B(b')" has been finally changed or generated, as shown in FIG. 5. Then, the virtualization layer 127 returns "B(b')" to the application layer 110 and accesses a system configuration of the restoration time point 1 generated before the restoration time point 2.

The virtualization layer 127 confirms that the information "A(a') has been finally stored based on the system configuration of the restoration time point 1, and returns the information "A(a')" to the application layer 110. The virtualization layer 127 accesses the initial restoration time point and checks the system configuration corresponding to the initial restoration time point. Since "A(a)" and "B(b)" have already been changed at the restoration time points 1 and 2 while "C(c)," "D(d)," and "E(e)" have not been changed at the restoration time points 1 and 2, "C(c)," "D(d)," and "E(e)" are returned to the application layer 110 so that the system restoration is completed. Accordingly, the restored system configuration is identical to the system configuration to be restored shown in FIG. 4. That is, if a request for the use of the system is input from the application layer 110 (e.g., a request to open a file "readme.txt"), the virtualization layer 127 performs an actual system restoration to open the file "readme.txt" corresponding to the target restoration time point. If the system restoration is completed, the application layer 110 opens the file "readme.txt" using the restored system configuration.

Accordingly, according to aspects of the present invention, if a system restoration is requested and performed, it is possible to provide a restored system environment without rebooting the system. Furthermore, according to aspects of the present invention, system configurations before restoration and after restoration co-exist in the restoration system 100.

Also, if re-booting of the system is requested or termination of the system is requested by the user, the system may be rebooted or terminated after the system configuration at the target restoration time point created by the virtualization layer 127 (i.e., the restored system configuration) is applied as a current system configuration. Accordingly, if the system is rebooted, the restored system configuration is stored to the current system configuration unit 131. Herein, an inquiry about whether the restored system configuration is applied as a current system configuration may be provided to the user such that the user has an option to select the restored system configuration. According to aspects of the present invention, the user uses the restored system without having to log off or reboot the system. However, in order to solve an overhead caused by the virtualization layer 127, the user may reboot the system and reflect the virtualized system configuration to the current system configuration, and then delete the virtualization layer 127.

Before the rebooting, the system configuration before restoration coexists with the system configuration after restoration. Accordingly, it is possible to make a conversion between an operating system environment before restoration and an operating system environment after restoration. That is, the operating system environment before restoration and the operating system environment after restoration may be provided to different desktop screens. For example, according to aspects of the present invention, a pop-up menu may be displayed allowing a user to select a scene conversion to the operating system environment after restoration or before restoration by clicking a right button of a mouse or an icon allowing a scene conversion may be provided through a main display of software used to execute aspects of the present invention.

Also, the system configuration before restoration and the system configuration after restoration may be provided in different physical desktops. That is, a plurality of monitors may be connected to one computer where software used to execute aspects of the present invention is installed such that respective monitors provide different operating systems for the respective restoration time points. Accordingly, a user confusion is solved and a user is allowed to use a plurality of operating systems.

Also, according to aspects of the present invention, it is possible for the user to select a plurality of target restoration time points when requesting a system restoration. For example, the user may want to select a plurality of target restoration points when the user wishes to test various restoration time points while maintaining a current system configuration. In this case, in order to restore a system, desktops are generated for respective restoration time points and different virtualization policies are applied in the respective desktops. For example, if a user selects the initial restoration time point and the restoration time point 2 as a target restoration time point, the restoration manger 125 generates a virtualization layer 127 and creates a single virtualized system configuration 133a. Then, if the use of the system is requested, the virtualization layer 127 accesses the initial restoration time point and performs a system restoration corresponding to the initial restoration time point and simultaneously or subsequently performs a system restoration corresponding to the restoration time point 2. If the system restoration is completed, the operating system layer 120 may provide an operating system before restoration and operating systems corresponding to the initial restoration time point and the restoration time point 2 on different desktop scenes. If the user cancels the system restoration, the system configuration corresponding to the initial restoration time point and the restoration time point 2 are deleted. Alternatively, the user can cancel just one of the system configurations corresponding to the initial restoration time point or the restoration time point 2.

Figure 6:
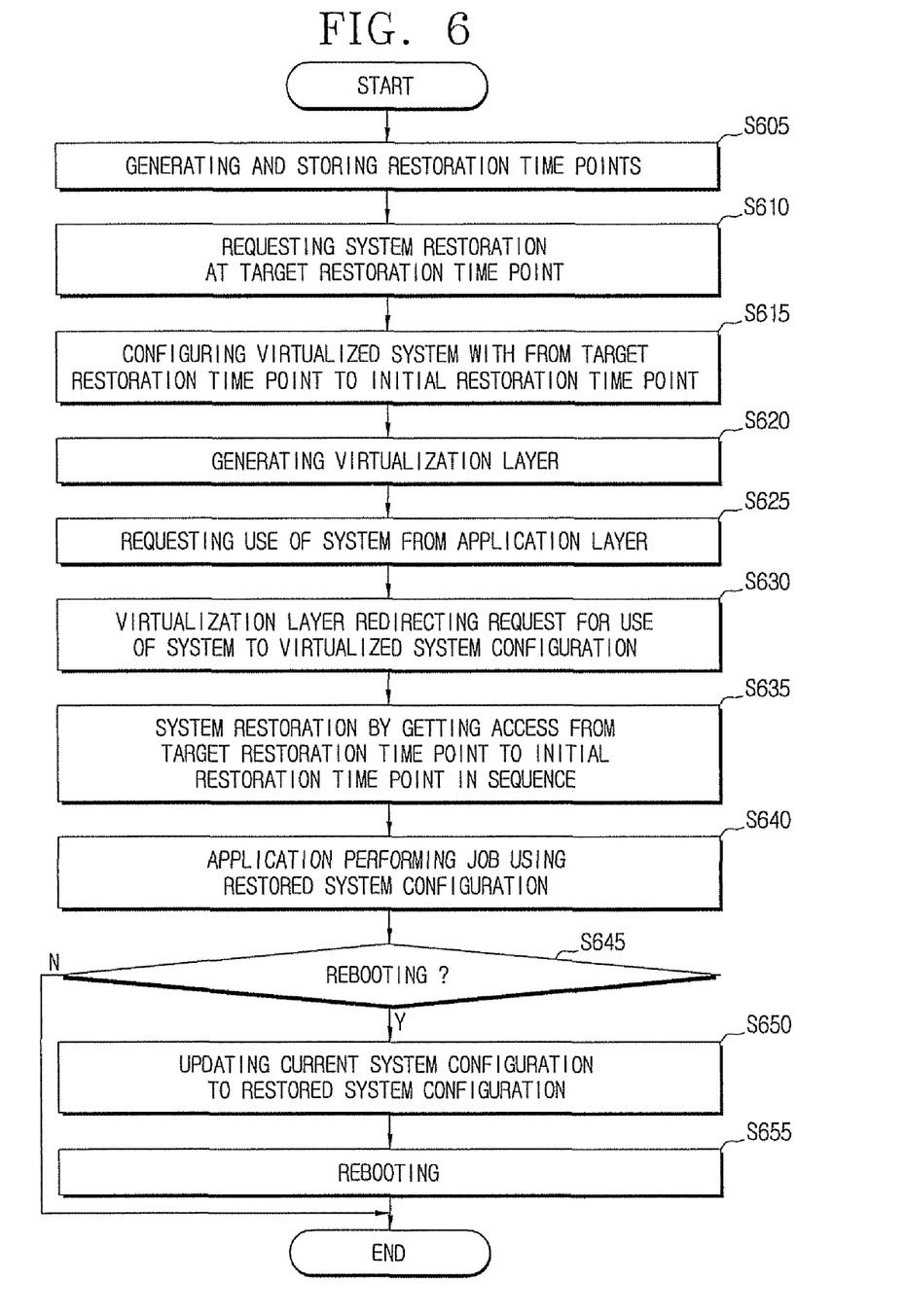
FIG. 6 is a flowchart illustrating a method of restoring a system using virtualization according to an embodiment of the present invention.

FIG. 6 is a flowchart illustrating a method of restoring a system using virtualization according to an embodiment of the present invention. Referring to FIGS. 1 to 6, if an event for a restoration object is generated or if a generation of a restoration time point is requested by a user, the restoration time point monitor 123 stores N number of restoration time points (where N is a positive number) to the storage layer 140 (as shown in FIG. 1) in operation S605. The restoration time points are stored as they are generated.

If a system restoration of a target restoration time point is requested by the restoration request unit 115 in operation S610, the restoration manger 125 configures a single virtualized system 133a from the target restoration time point to an initial restoration time point in operation S615, and generates the virtualization layer 127 in the operating system layer 120 in S620. Consequently, the application layer 110 recognizes that the system restoration has been completed.

If the use of a system is requested by the application layer 110 in operation S625, the virtualization layer 127 redirects the request of the application layer 110 output from the second system access unit 121 to the virtualized system configuration 133a in operation S630. Then, the virtualization layer 127 accesses the virtualized system configuration 133a from the target restoration time point to the initial restoration time point and performs an actual system restoration in operation S635. That is, the virtualization layer 127 performs a system restoration by accessing the virtualized system configuration 133a from the target restoration time point to the initial restoration time point, which is a reverse order to the order in which the restoration points are stored, and returns a result of restoring the system to the application layer 110. The restored system configuration is loaded to a memory and temporarily stored thereto.

The application performs a requested job using the restored system configuration in operation S640. If a rebooting is requested by the application layer 110 in operation S645, the operating system layer 120 updates the current system configuration stored in the current system configuration unit 131 to the restored system configuration in operation S650 and then reboots the system in operation S655.

After the rebooting is requested by the application layer 110 (operation S645), an on-screen display (OSD) or a pop-up window questioning the user on whether to update the current system configuration to the restored system configuration may be displayed. The present program is programmed to perform the updating of the current system configuration to the restored system configuration (operation S650) according to a user's selection.

Figure 7:
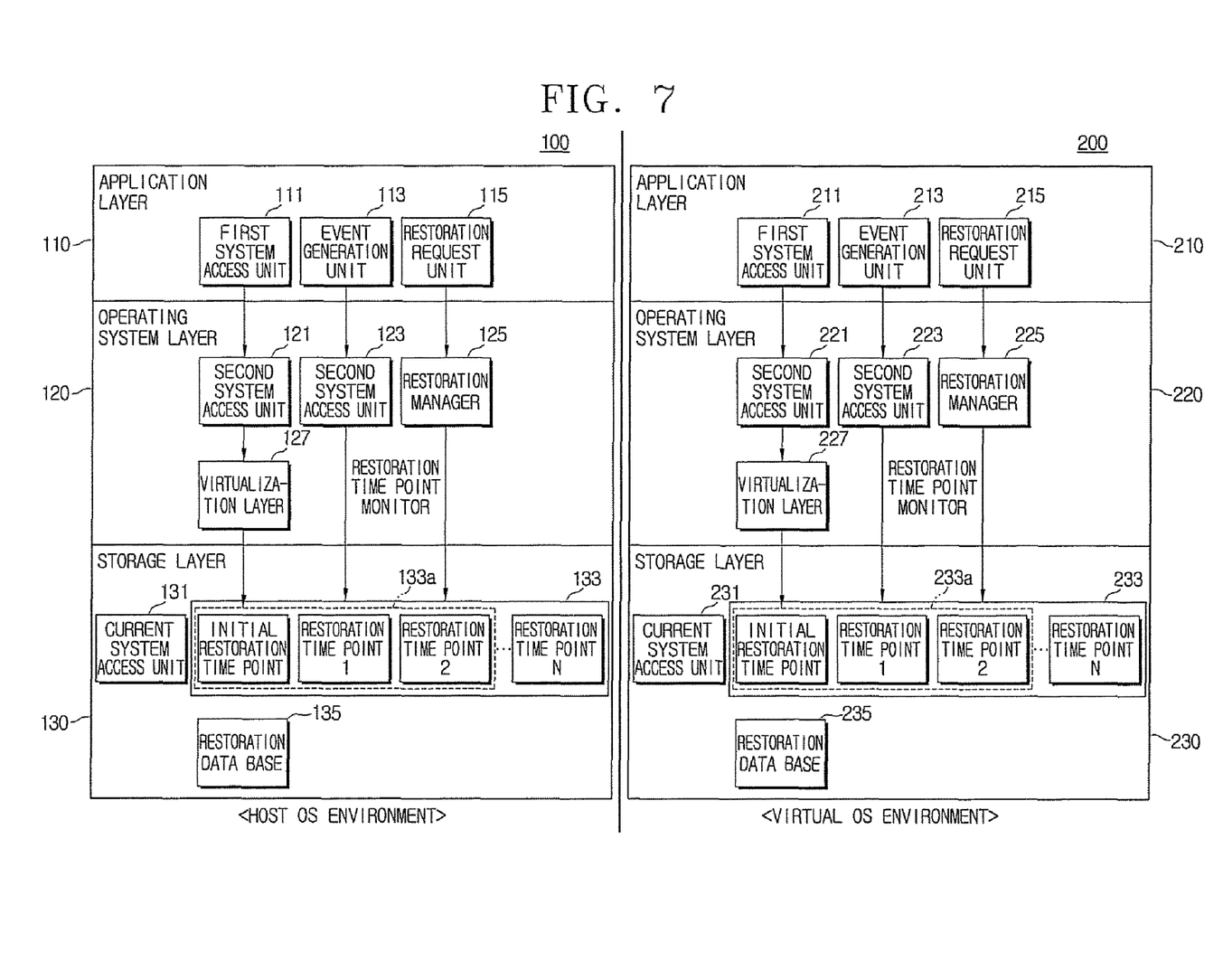
FIG. 7 is a block diagram illustrating the restoration system of FIGS. 1 and 2 operated in a virtualization operating system according to an embodiment of the present invention.

FIG. 7 is a view illustrating an embodiment of the present invention whereby the restoration system of FIGS. 1 and 2 is operated in a virtual operating system. Referring to FIG. 7, a host OS installed in a host computer and a virtual OS installed in a mobile storage medium belong to a Windows operating system. By way of example, the mobile storage medium is a Universal Serial Bus (USB) memory. The USB memory installs thereto a virtual OS, an application program, and a restoration program to restore the system. Accordingly, it is possible to perform a virtualization in the host computer without a process of re-installing the application and the restoration program installed to the USB memory to the host computer to which the restoration system of FIGS. 1 and 2 is applied.

If the USB memory is connected to the host computer when the user performs a job on the host OS, the host computer may convert to a virtual environment. If there is a conversion to the virtual environment, the user performs a job as if the program installed in the USB memory is located in the host computer, without installing an extra program in the host computer or transferring the program from the USB memory to the host computer.

Referring to FIG. 7, a restoration system 200 usable in the virtual OS environment of the USB memory has an application layer 210, an operating system layer 220, and a storage layer 230. Furthermore, operations of the application layer 210, the operating system layer 220, and the storage layer 230 are similar to those of the application layer 110, the operating layer 120, and the storage layer 130 of FIG. 1, and thus detailed descriptions thereof will be omitted.

However, if a system restoration of a target restoration time point is requested by the restoration request unit 215 while the user performs a job under the virtual environment using the virtual OS, the restoration manager 225 configures a single virtualized system 233a and generates a virtualization layer, as described above with reference to FIGS. 1 to 6. Then, if the use of the system is requested by the application layer 210, the virtualization layer 227 accesses the virtualized system configuration 233a, performs the system restoration to the target restoration time point, and returns a result of the system restoration to the application layer 210. Consequently, the application layer 210 performs a corresponding job using the restored system configuration.

According a the method and apparatus to restore a system using virtualization according to aspects of the present invention, a user is not required to log off to restore the system. Thus, a continued use of the system is possible. Also, according to aspects of the present invention, a rebooting is not required to reflect the restored system and a time taken to restore the system is shortened so that the user can more rapidly use the restored system.

Also, according to aspects of the present invention, if there is an error in restoring the system, a system configuration before restoration (i.e., a current system configuration) can be used without repeating the logging off or rebooting of the system. That is, aspects of the present invention allow easy movement to the restored system at various restoration time points without rebooting the system.

Furthermore, according to aspects of the present invention, it is possible make a conversion between a current system configuration before restoration and a system configuration after restoration since a rebooting is not performed after restoration, and also a scene conversion is performed using a virtual desktop. Moreover, according to aspects of the present invention, since the system restoration of a plurality of restoration time points can be performed, it is possible to convert to the restored system configuration at each restoration time point, and thus the user can perform a job under different operation systems. It is further understood that aspects of the present invention are applicable to a virtual operating system environment stored to a mobile storage medium.

Aspects of the present invention can also be embodied as computer-readable codes on a computer-readable recording medium. Also, codes and code segments to accomplish the present invention can be easily construed by programmers skilled in the art to which the present invention pertains. The computer-readable recording medium is any data storage device that can store data which can be thereafter read by a computer system or computer code processing apparatus. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of restoring a system using virtualization, the method comprising:
   generating a virtualization layer in response to a request for a system restoration at a target restoration time point from among a plurality of restoration time points, the restoration time points and virtualization layer being generated by the system;
   accessing multiple restoration time points, including the target restoration time point, spanning the range of restoration time points from the target restoration time point to an initial restoration time point using the virtualization layer of the system, in response to a request to use the system by an application layer; and
   performing the system restoration based on information accessed at the multiple restoration time points.

2. The method as claimed in claim 1, further comprising:
   establishing, when the system restoration is requested, a virtualization restoration policy; and
   configuring a single virtualization system from the target restoration time point to the initial restoration time point according to the virtualization restoration policy.

3. The method as claimed in claim 2, wherein:
   the virtualization restoration policy comprises a priority order policy, and
   the virtualization layer accesses restoration points from the target restoration time point to the initial restoration time point in sequence based on the priority order policy.

4. The method as claimed in claim 2, wherein the accessing of the target restoration time point comprises:
   redirecting, by the virtualization layer, a request from the application layer to the virtualization system; and
   accessing, by the virtualization layer, the target restoration time point of the virtualization system.

5. The method as claimed in claim 1, wherein the application layer recognizes that the system restoration has been performed when the virtualization layer is generated.

6. The method as claimed in claim 1, wherein the system restoration is completed without rebooting the system.

7. The method as claimed in claim 1, further comprising executing, by the application layer, a job related to the request for the use of the system when the system restoration is completed.

8. The method as claimed in claim 7, further comprising:
   requesting, after the system restoration is completed, a rebooting of the system;
   applying a system configuration at the restored target restoration time point as a current system configuration according to the request for the rebooting of the system; and
   performing the rebooting.

9. The method as claimed in claim 8, wherein the applying of the system configuration at the target restoration time point as the current system configuration comprises applying the system configuration at the target restoration time point as the current system configuration according to a selection by a user.

10. The method as claimed in claim 1, wherein the virtualization layer is generated in an operating system layer of the system.

11. The method as claimed in claim 1, wherein:
    the plurality of restoration time points are stored in order as the plurality of restoration time points are generated; and
    the performing of the system restoration comprises accessing the target restoration time point to the initial restoration time point in a reverse order to the storing order.

12. The method as claimed in claim 1, wherein the system restoration is performed in a host operating system or a virtual operating system installed in a mobile storage medium.

13. The method as claimed in claim 1, wherein, when a plurality of target restoration time points are selected, system restorations for the plurality of the target restoration time points are simultaneously performed.

14. The method as claimed in claim 13, wherein the system restorations corresponding to the respective target restoration time points are respectively provided through different desktop scenes.

15. The method as claimed in claim 1, further comprising restoring, as part of the system restoration, an operating system of the system at the target restoration time point.

16. The method as claimed in claim 1, wherein the target restoration time point corresponds to a restoration time selected by a user for restoration of the system.

17. The method of claim 1, wherein the system restoration comprises cancelling system files, registry keys, and installed programs and restoring settings and performances of the system to a previous state.

18. A restoration system using virtualization, the system comprising:
    a non-transitory storage medium;
    a storage layer configured to store a plurality of restoration time points in the storage medium;
    an application layer configured to request a use of the system and to request a system restoration at a target restoration time point from among the plurality of restoration time points; and
    an operating system layer configured to generate the restoration time points, generate a virtualization layer when the application layer requests the system restoration, and to perform the system restoration at the target restoration time point using the virtualization layer when the application layer requests the use of the system, wherein
    the operating system layer is configured to perform the system restoration by
        accessing multiple restoration time points, including the target restoration time point, spanning a range of restoration time points from the target restoration time point to an initial restoration time point, and applying information accessed at the multiple restoration time points to a configuration of the system.

19. The restoration system as claimed in claim 18, wherein the operating system layer comprises a restoration manger to, when the system restoration is requested, establish a virtualization restoration policy and to configure a single virtualization system from the target restoration time point to the initial restoration time point according to the virtualization restoration policy.

20. The restoration system as claimed in claim 19, wherein the virtualization restoration policy comprises a priority order policy, and the virtualization layer accesses restoration points from the target restoration time point to the initial restoration time point in sequence based on the priority order policy.

21. The restoration system as claimed in claim 19, wherein the virtualization layer redirects a request from the application layer to the virtual system and accesses the target restoration time point of the virtualization system.

22. The restoration system as claimed in claim 18, wherein:
the application layer recognizes that the system restoration has been performed if the virtualization layer is generated; and the application layer performs a job related to the request when the system restoration is completed.

23. The restoration system as claimed in claim 22, wherein, when a rebooting of the system is requested after the system restoration has been completed, the operating system layer applies the system configuration of the restored restoration time points as a current system configuration and then performs the rebooting.

24. The restoration system as claimed in claim 18, wherein the system restoration is performed in a host operating system or a virtual operating system installed in a mobile storage medium.

25. The restoration system as claimed in claim 18, wherein, when a plurality of target restoration time points are selected, the operating system layer simultaneously performs system restorations for the plurality of target restoration time points.

26. The restoration system as claimed in claim 25, wherein the operating system layer provides the system restorations, corresponding to the respective target restoration time points to be respectively performed, on different desktop scenes.

27. The restoration system as claimed in claim 18, wherein the system comprises an operating system and the system restoration comprises restoring the operating system at the target restoration time point.

28. The restoration system as claimed in claim 18, wherein the target restoration time point corresponds to a restoration time selected by a user for restoration of the system.

29. The system of claim 18, wherein the system restoration comprises cancelling system files, registry keys, and installed programs and restoring settings and performances of the system to a previous state.

* * * * *